United States Patent
Gordon et al.

(10) Patent No.: US 10,826,702 B2
(45) Date of Patent: *Nov. 3, 2020

(54) SECURE AUTHENTICATION OF USER AND MOBILE DEVICE

(71) Applicant: Visa International Service Association, San Francisco, CA (US)

(72) Inventors: James Gordon, Lafayette, CA (US); Roopesh Joshi, San Ramon, CA (US); David Horton, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,431

(22) Filed: May 22, 2019

(65) Prior Publication Data

US 2019/0273615 A1    Sep. 5, 2019

Related U.S. Application Data

(63) Continuation of application No. 16/107,866, filed on Aug. 21, 2018, now Pat. No. 10,341,111, which is a
(Continued)

(51) Int. Cl.
| | |
|---|---|
| *H04L 9/32* | (2006.01) |
| *H04L 29/06* | (2006.01) |
| *H04W 12/06* | (2009.01) |

(52) U.S. Cl.
CPC ............ *H04L 9/3228* (2013.01); *H04L 9/321* (2013.01); *H04L 9/3231* (2013.01);
(Continued)

(58) Field of Classification Search
CPC ..... H04L 9/3228; H04L 9/321; H04L 9/3297; H04L 63/0861; H04L 9/3231;
(Continued)

(56) References Cited

U.S. PATENT DOCUMENTS

| | | | |
|---|---|---|---|
| 8,327,143 B2 | 12/2012 | Ilyadis | |
| 8,745,390 B1 | 6/2014 | Atwood et al. | |

(Continued)

FOREIGN PATENT DOCUMENTS

| | | |
|---|---|---|
| CN | 101351027 | 1/2009 |
| CN | 103248495 | 8/2013 |

(Continued)

OTHER PUBLICATIONS

International Search Report and Written Opinion, dated Jun. 8, 2016, PCT Application No. PCT/US2016/018339, 13 pages.
(Continued)

*Primary Examiner* — Christopher A Revak
(74) *Attorney, Agent, or Firm* — Kilpatrick Townsend & Stockton LLP

(57) ABSTRACT

An authentication method is disclosed. To authenticate a user, a mobile device may request identification and verification from the user. Upon receiving a positive identification and verification response from the user, the mobile device may generate a cryptogram using a user identification (ID) associated with the user, a timestamp, a device ID associated with the mobile device, a service provider application ID associated with the service provider application, and a service provider device ID. The mobile device may transmit the generated cryptogram, the user ID, the timestamp, the device ID, the service provider application ID, and the service provider device ID, to a service provider computer associated with the service provider application. The service provider computer may decrypt the cryptogram and compare the decrypted data elements to the received data elements to validate and authenticate the user.

19 Claims, 5 Drawing Sheets

Related U.S. Application Data continuation of application No. 15/046,341, filed on Feb. 17, 2016, now Pat. No. 10,116,447.

(60) Provisional application No. 62/117,277, filed on Feb. 17, 2015.

(52) U.S. Cl.
CPC .......... *H04L 9/3234* (2013.01); *H04L 9/3297* (2013.01); *H04L 63/0861* (2013.01); *H04W 12/0608* (2019.01); *H04W 12/0609* (2019.01); *H04L 2209/56* (2013.01); *H04L 2209/80* (2013.01); *H04L 2463/121* (2013.01)

(58) Field of Classification Search
CPC ............... H04L 9/3234; H04L 2209/56; H04L 2209/80; H04L 2463/121; H04W 12/06
See application file for complete search history.

(56) References Cited

U.S. PATENT DOCUMENTS

| | | | | |
|---|---|---|---|---|
| 10,116,447 B2 * | 10/2018 | Gordon | ............... | H04L 9/3228 |
| 10,341,111 B2 * | 7/2019 | Gordon | ............... | H04L 9/321 |
| 10,579,987 B2 * | 3/2020 | Chen | ............... | G06Q 20/385 |
| 2005/0043997 A1 | 2/2005 | Sahota et al. | | |
| 2012/0018511 A1 | 1/2012 | Hammad | | |
| 2012/0033807 A1 | 2/2012 | Asim et al. | | |
| 2012/0317035 A1 | 12/2012 | Royyuru et al. | | |
| 2013/0268437 A1 * | 10/2013 | Desai | ............... | G06Q 20/08 |
| | | | | 705/41 |
| 2014/0089113 A1 * | 3/2014 | Desai | ............... | G06Q 20/322 |
| | | | | 705/16 |
| 2014/0101434 A1 | 4/2014 | Senthurpandi et al. | | |
| 2014/0101453 A1 | 4/2014 | Sethurpandi | | |
| 2014/0250006 A1 | 9/2014 | Makhotin et al. | | |
| 2014/0372308 A1 | 12/2014 | Sheets | | |
| 2015/0016264 A1 | 1/2015 | Backholm | | |
| 2015/0032625 A1 | 1/2015 | Dill et al. | | |
| 2015/0046340 A1 | 2/2015 | Dimmick | | |
| 2015/0120472 A1 * | 4/2015 | Aabye | ............... | G06Q 20/322 |
| | | | | 705/16 |
| 2015/0127547 A1 | 5/2015 | Powell et al. | | |
| 2015/0180836 A1 | 6/2015 | Wong et al. | | |
| 2015/0262170 A1 | 9/2015 | Bouda | | |
| 2015/0302398 A1 * | 10/2015 | Desai | ............... | G06Q 20/32 |
| | | | | 705/41 |
| 2015/0327072 A1 | 11/2015 | Powell et al. | | |
| 2015/0373523 A1 | 12/2015 | Jeong et al. | | |
| 2016/0019536 A1 * | 1/2016 | Ortiz | ............... | G06Q 20/3227 |
| | | | | 705/67 |
| 2016/0036790 A1 | 2/2016 | Shastry et al. | | |
| 2016/0057619 A1 * | 2/2016 | Lopez | ............... | G06Q 20/3825 |
| | | | | 380/247 |
| 2016/0127902 A1 | 5/2016 | Ciarniello et al. | | |
| 2016/0173483 A1 | 6/2016 | Wong et al. | | |
| 2016/0191236 A1 * | 6/2016 | Smirnoff | ............... | H04L 9/0897 |
| | | | | 713/171 |
| 2016/0241402 A1 | 8/2016 | Gordon et al. | | |
| 2016/0328707 A1 | 11/2016 | Wagner et al. | | |
| 2017/0230825 A1 | 8/2017 | Counterman | | |
| 2018/0006821 A1 | 1/2018 | Kinagii | | |
| 2018/0211248 A1 * | 7/2018 | Sims | ............... | G06Q 20/3672 |
| 2019/0114608 A1 * | 4/2019 | Nelms | ............... | G06Q 20/204 |

FOREIGN PATENT DOCUMENTS

| | | |
|---|---|---|
| EP | 2819083 A1 | 12/2014 |
| WO | 2014198745 A1 | 12/2014 |

OTHER PUBLICATIONS

CN201680010553.2 , "Office Action", dated Mar. 20, 2020, 16 pages.
EP16753007.0 , "Office Action", dated Mar. 9, 2020, 4 pages.

\* cited by examiner

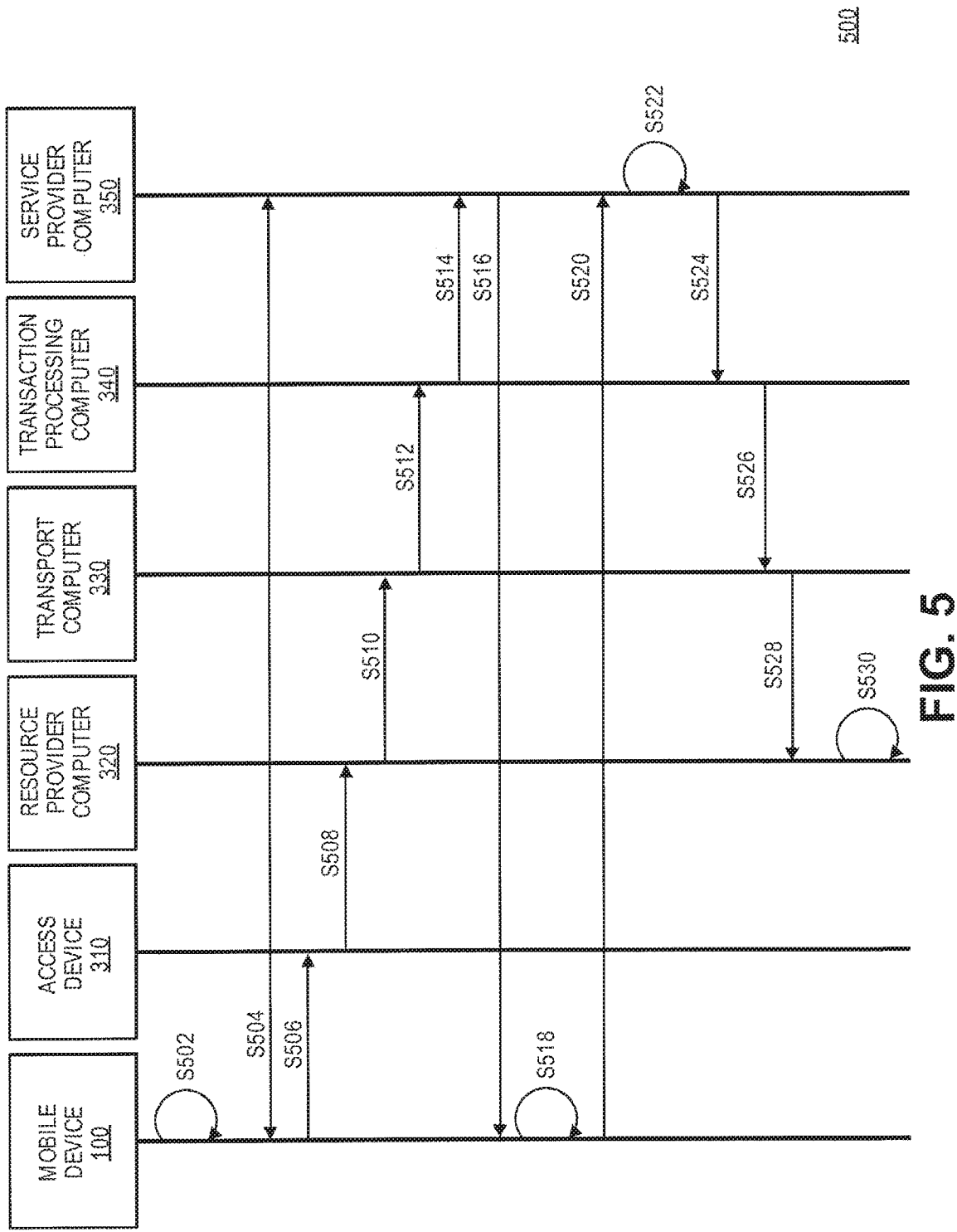

SECURE AUTHENTICATION OF USER AND MOBILE DEVICE

CROSS REFERENCE TO RELATED APPLICATIONS

This application is a continuation application of U.S. application Ser. No. 16/107,866, filed on Aug. 21, 2018, which is a continuation application of Ser. No. 15/046,341, filed on Feb. 17, 2016, now U.S. Pat. No. 10,116,447, which is a non-provisional application of and claims the benefit of the filing date of U.S. Provisional Application No. 62/117,277, filed on Feb. 17, 2015, which are herein incorporated by reference in their entirety for all purposes.

BACKGROUND

The use of mobile devices to access various services has increased over the last few years. Many service provider applications that can be executed on the mobile devices exist for accessing these various services. However, these service provider applications do not have a reliable way to confirm to back end services (e.g., service provider services) that the service provider applications are communicating from the correct device and that they are being used by the correct user without additional login steps.

Embodiments of the invention address these and other problems individually and collectively.

SUMMARY

One embodiment of the invention is directed to a method for authentication. The method includes receiving, by a mobile device, a user request to access a service provider application. In response to the user request to access the service provider application, the method also includes requesting, by the mobile device, identification and verification from the user via an identification and verification application residing within the mobile device. The method also includes receiving, by the mobile device, a positive identification and verification response. The method further includes generating, by the mobile device, a cryptogram using one or more of a user identification (ID) associated with the user, a timestamp, a device ID associated with the mobile device, a service provider application ID associated with the service provider application, and a service provider device ID. The method additionally includes transmitting, by the mobile device, the generated cryptogram, and one or more of the user ID, the timestamp, the device ID, the service provider application ID, and the service provider device ID, to a service provider computer associated with the service provider application. The transmission of these to the service provider computer can occur at the same or different times.

Another embodiment of the invention is directed to a computer comprising a processor, and a computer readable medium. The computer readable medium comprises code, for causing the processor to perform the above-described method.

Another embodiment of the invention is directed to a method for authentication including receiving, by a service provider computer associated with a service provider application, a generated cryptogram, a user ID, a timestamp, a device ID, and a service provider application ID, wherein the generated cryptogram was generated by a mobile device and encrypts the user ID, the timestamp, the device ID, and the service provider application ID. The method also includes decrypting, by the service provider, the received generated cryptogram. The method further includes verifying, by the service provider computer, the cryptogram by determining a plurality of data elements encoded within the cryptogram, and then comparing the determined plurality of data elements to the user ID, the timestamp, the device ID, the service provider application ID, and the service provider device ID received by the service provider computer.

Further details regarding embodiments of the invention can be found in the Detailed Description and the Figures.

BRIEF DESCRIPTION OF THE DRAWINGS

FIG. 5 illustrates the steps of a transaction using a secure authentication system, according to some embodiments of the invention.

DETAILED DESCRIPTION

Figure 1:
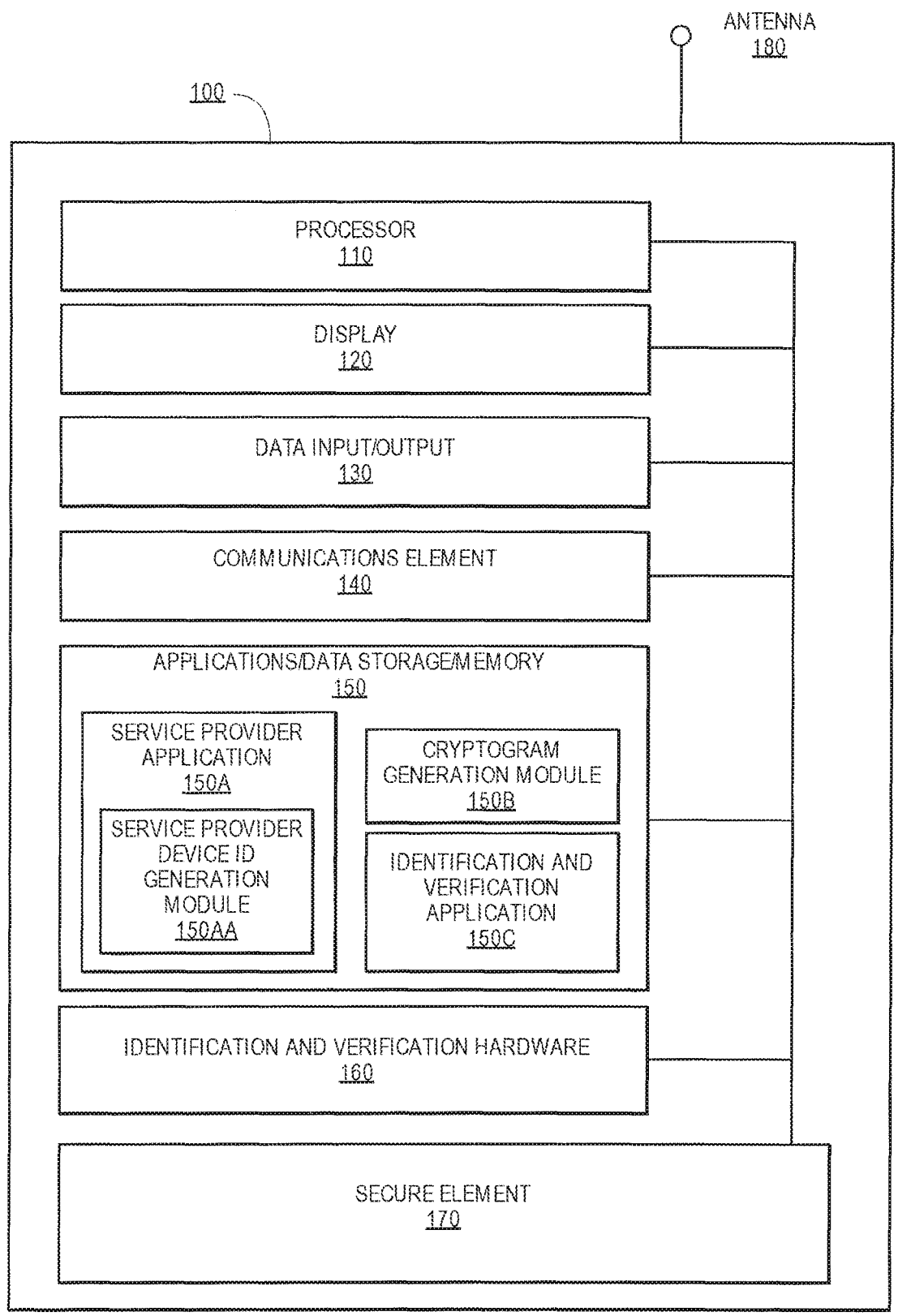
FIG. 1 shows a block diagram of a mobile device, according to some embodiments of the invention.

Embodiments of the present invention are directed to secure authentication of a user and a mobile device to service providers. Embodiments of the invention can provide confidence to the service provider that a user is an authentic user and that a mobile device being used to access the third-party service is an authentic mobile device.

In embodiments of the invention, a user can open a service provider application associated with a service provider on his/her mobile device. Instead of presenting a traditional login prompt, for the user to login to the service provider application with his/her credentials, the service provider application may instead request identification and verification (ID&V) of the user from an ID&V application residing within the mobile device. In some embodiments, the ID&V application may be a service built into the operating system (OS) of the mobile device. The ID&V application may then request that the user authenticate with the application by, for example, providing a biometric identification such as a fingerprint. Upon positive ID&V from the user, the mobile device may generate a cryptogram including various data elements. These data elements may include, but are not limited to, a user identification (ID) associated with the user, a timestamp, a device ID associated with the mobile device, a service provider application ID associated with the service provider application, and a service provider device ID. These data elements and the cryptogram may be sent to a service provider computer associated with the service provider application. In some embodiments, the cryptogram may be sent out of band (e.g., over a different channel than the data elements) to the service provider computer. The service provider computer may then verify that the received data elements match the data elements encrypted within the cryptogram. Upon positive verification, the service provider computer may be confident that the user is an authentic user and the mobile device being used to access the service provider computer or service is also authentic.

Embodiments of the invention provide for improved security because the various data elements encrypted in the cryptogram are obtained from multiple sources. For example, the device ID is unique to the mobile device, the service provider device ID is unique to a combination of the user and the device, and the timestamp is obtained from the OS of the mobile device and provides data regarding the time of the ID&V process. Accordingly, it would be extremely difficult for a fraudster to obtain these data elements from multiple sources in order to attempt to perform fraudulent transaction with the service provider computer or service, via the service provider application.

Embodiments of the invention, as discussed herein, will primarily be described as pertaining to financial transactions and payment systems. However, embodiments of the invention can also be used in other systems such as social networks, healthcare systems, or any other service provider system requiring authentication.

Prior to discussing specific embodiments of the invention, some terms may be described in detail.

A "mobile device" may comprise any suitable electronic device that may be transported and operated by a user, which may also provide remote communication capabilities to a network, Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. A payment device may be used to conduct a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes, Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority, A credential may be a string of numbers, letters, or any other suitable characters, as well as any object or document that can serve as confirmation, Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may allow the user to load one or more payment cards onto the digital wallet so as to make a payment without having to enter an account number or present a physical card.

A "digital wallet provider" may include an entity that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "resource provider" may be an entity that can provide a resource such as goods, services, information, and/or access, Examples of a resource provider includes merchants, access devices, secure data access points, etc. A "merchant" may typically be an entity that engages in transactions and can goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval— transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments; a service provider computer may be a server computer.

A "cryptogram" may refer to an encrypted representation of some information, A cryptogram can be used by a recipient to determine if the generator of the cryptogram is in possession of a proper key, for example, by encrypting the underlying information with a valid key, and comparing the result to the received cryptogram.

A "service provider application" may be an application developed or maintained by a service provider. The service provider application may provide a front-end interface for the user to access back-end services provided by a service provider computer. A service provider application may be downloaded from a mobile application store and installed on the mobile device.

A "service provider computer" may be a computer that is operated by a service provider.

A "user ID" may refer to any data that may identify the user. The user ID may be unique to the user of the mobile device. For example, the user id may be an alphanumeric user name, a primary account number (PAN), a telephone number, social security number, etc.

A "device ID" may refer to any data that may identify the particular mobile device. The device ID may be assigned to the device by the manufacturer of the device at the time of manufacturing. The device ID may be hardcoded onto a chip residing within the mobile device. In some embodiments, the device ID may be coded in software. The device ID may be unique to the mobile device. For example, the device ID may be an ID associated with a secure element or trusted execution environment chip.

A "service provider application ID" may refer to any data that identifies the service provider application on the mobile device. In some embodiments, the service provider application ID may be assigned to the service provider application by the OS running on the mobile device at the time the service provider application is installed. In some embodiments, the service provider application ID may be defined by the service provider application itself, and the service provider application ID may be the same for the service provider application across multiple mobile devices.

A "service provider device ID" may refer to data that identifies a combination of the mobile device and specific user of the service provider application. The service provider device ID may be generated and assigned to the service provider application by the service provider application computer at the time the user installs and enrolls with the service provider application on his/her mobile device. The service provider computer may generate a service provider device ID that uniquely identifies the mobile device used at the time of registration and the user that registered with the service provider application. The service provider device ID may then be stored locally within the service provider application.

The various IDs above, including the user ID, device ID, service provider application ID, and service provider device ID, may be of any suitable length and may include any suitable number or types of characters.

An example of a mobile device 100, according to some embodiments of the invention, is shown in FIG. 1, Mobile device 100 may include circuitry that is used to enable certain device functions, such as telephony. The functional elements responsible for enabling those functions may include a processor 110 that can execute instructions that implement the functions and operations of the device. Processor 110 may access memory 150 (or another suitable data storage region or element) to retrieve instructions or data used in executing the instructions.

Data input/output elements 130, such as a keyboard or touchscreen, may be used to enable a user to operate the mobile device 100 and input data (e.g., user authentication data). Other data input elements may include biometric sensors including fingerprint, voice, and retinal scanning devices. Data input/output elements may also be configured to output data (via a speaker, for example). Display 120 may also be used to output data to a user.

Communications element 140 may be used to enable data transfer between mobile device 100 and a wired or wireless network (via antenna 180, for example) to assist in connectivity to the Internet or other network, and enabling data transfer functions. Mobile device 100 may also include communications element interface 140 to enable data transfer between the identification and verification hardware 160 and other elements of the device, where identification and verification hardware 160 may be coupled to a secure element 170. As noted, a cellular phone, smartphone, or similar device is an example of a mobile device 100 that may be used in accordance with embodiments of the present invention. However, other forms or types of devices may be used without departing from the underlying concepts of the invention. For example, the mobile device 100 may alternatively be in the form of a payment card, a key fob, a tablet computer, a wearable device, etc.

The memory 150 may comprise a service provider application 150A, a cryptogram generation module 150B, identification and verification application 150C, and any other suitable module or data. The mobile device 100 may have any number of mobile applications installed or stored on the memory 150 and is not limited to that shown in FIG. 1. The memory 150 may also comprise code, executable by the processor 110 for implementing a method comprising receiving, by the mobile device, a user request to access a service provider application; in response to the user request to access the service provider application, requesting, by the mobile device, identification and verification from the user via an identification and verification application residing within the mobile device; receiving, by the mobile device, a positive identification and verification response; generating, by the mobile device, a cryptogram based on a plurality of data elements, the plurality of data elements comprising a user identification (ID) associated with the user, a timestamp, a device ID associated with the mobile device, a service provider application ID associated with the service provider application, and a service provider device ID; and transmitting, by the mobile device, the generated cryptogram, the user ID, the timestamp, the device ID, the service provider application ID, and the service provider device ID, to a service provider computer associated with the service provider application.

The service provider application 150A may comprise code that, when executed, provides a user interface for the user to provide input and initiate, facilitate, and manage interactions with a service provider computer or service provider using the mobile device 100. The service provider application 150A may work with the processor 110 to access back end services provided by a service provider computer or service provider via communications element 140. The service provider application 150A may work with the processor 110 to store a service provider device ID that was generated by the service provider computer at the time the service provider application 150A registered with the service provider computer. The service provider application 150A may work with the processor 110 to cause the mobile device 100 to transmit, to the service provider computer, data associated with the service provider service in any suitable manner (e.g., over the Internet).

In one example, the service provider application 150A may be associated with and/or provided by a digital wallet provider computer. The service provider application 150A, may be used by a user to access payment credentials stored in a service provider application 150A (e.g., a digital wallet application) to initiate a transaction. The service provider application 150A may transmit data to and receive data from the service provider computer prior to granting access to the payment credentials stored in the service provider application 150A.

The cryptogram generation module 150B may comprise code that, when executed, causes the processor 110 to generate a cryptogram based on various data elements associated with the service provider application 150A and/or mobile device 100. For example, the cryptogram generation module 150B may contain logic that causes the processor 110 to generate a cryptogram using a user identification (ID) associated with the user, a timestamp, a device ID associated with the mobile device, a service provider application ID associated with the service provider application, and a service provider device ID, In some embodiments, the mobile device 100 may be able to communicate over-the-air with the service provider computer, and thus the cryptogram generation module 150B may be able to send the generated cryptogram to the service provider computer. In some embodiments, the cryptogram generation module 150B may interface with the secure element 170 to generate the cryptogram securely within the secure element 170. The secure element 170 may be a tamper-resistant platform (e.g., a one chip secure microcontroller) capable of securely hosting applications and their confidential and cryptographic data (e.g. key management) in accordance with the rules and security requirements set forth by a set of well-identified trusted authorities. The secure element 170 may store a uniquely derived key (UDK) or derived key index (DKI) that is used by the cryptogram generation module 150B to encrypt the cryptogram, Once the cryptogram is generated within the secure element 170, the cryptogram may be passed on to the service provider application 150A, In some embodiments, once the cryptogram is generated within the secure element 170, the cryptogram may be passed directly to the service provider computer.

The identification and verification application 150C may comprise code that, when executed, provides for identification and verification services on the mobile device 100. The identification and verification application 150C may also present a graphical user interface in order for the user to authentication with the ID&V services. The identification and verification application 150C may be executed at an OS level of the mobile device, and may be integrated into the core features of the OS. The identification and verification application 150C may interface with the identification and verification hardware 160 in order to obtain ID&V from the user. The identification and verification hardware 160 may include hardware for obtaining data pertaining to the user and used for the ID&V. For example, the identification and verification hardware 160 may include biometric sensors such as a fingerprint sensor, iris scanner, or microphone for voice data input.

Figure 2:
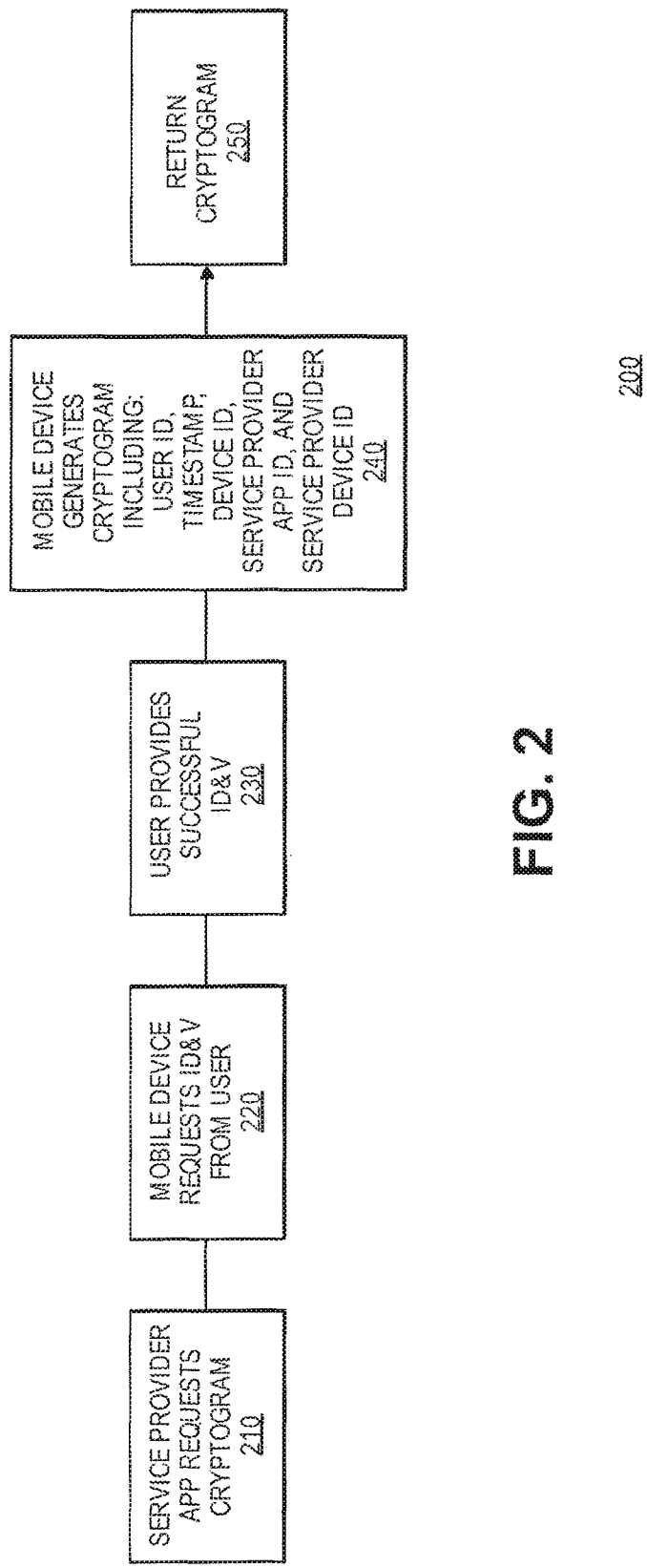
FIG. 2 shows a flow diagram illustrating a method for generating a cryptogram, according to some embodiments of the invention.

FIG. 2 shows a flow diagram illustrating a method 200 for generating a cryptogram, according to some embodiments of the invention. The method may part of a secure authentication system that includes the mobile device 100. As mentioned earlier, the mobile device 100 may include a Trusted Execution Environment (TEE) or Secure Element (SE) 170 that can support ID&V services. The mobile device 100 may include identification and verification hardware 160, such as for example, a fingerprint reader, camera, and/or microphone to facilitate the ID&V services. In some embodiments, a physical interface may exist between the identification and verification hardware 160 and the TEE/SE 170, such as a bus. The physical interface may reduce the chance that a fraudulent picture or sound file, for example, is being used to fake identification with the identification and verification hardware 160. The use of a TEE or SE 170 may help ensure that a trusted mobile device 100 is in fact the actual device communicating with a back end service provided by a service provider computer because fraudulent activity would typically involve deep access into secure storage within the mobile device 100 (such as access to the TEE or SE 170).

In some embodiments, the TEE or SE 170 may have a unique hardware ID (e.g., device ID) that can be used to identify the mobile device 100. In some embodiments, the mobile device 100 may allow for, on initial setup of the device, setting up of a new identity of the device which downloads a user ID, uniquely derived key (UDK) or derived key index (DKI) to the SE/TEE 170. UDK's are particularly useful, since they can be derived using user-specific information such as user specific account information (e.g., a PAN, expiration date, service code, etc.). UDKs do not need to be transmitted to encryption endpoints and can be unique to users. A derived key index may be a location for a UDK in a database if the UDK is not generated on demand, Upon initial setup of the device, the UDK may be paired to an account identifier (e.g., a PAN), If the cryptogram is generated using the wrong PAN or on a mobile device 100 with a different UDK, the service provider computer may be unable to decrypt the cryptogram and as a result may suspect and prevent a fraudulent authentication attempt.

The above downloaded information may only be needed with the setup of an identity. In other embodiments, upon confirmation of ID&V through a secondary channel (e.g., an issuer or other service provider based ID&V link), the user ID associated with the user on the mobile device 100 may be linked to a service provider ID, such as the user's issuer ID or the user's payment processing network ID.

The embodiments described herein may allow for service provider applications (e.g., a bank application, social network application, healthcare application) to ask for and send a cryptogram that confirms that the correct device is communicating to back end services provided by a service provider computer and that the user recently used the ID&V application 150C to positively identify themselves. Initially, a registration process may occur to register the user's mobile device 100 with the back end service provided by the service provider computer (e.g., a bank, social network provider, healthcare institution). In an example, a user may authenticate themselves with a bank by using the mobile device 100 and a biometric ID (e.g., a thumbprint), and also login to the service provider application 150A using his/her username and password to validate themselves. The bank (e.g., service provider computer) may associate the user by linking the user's payment account to the user ID associated with the service provider application. After registration, the bank end service (e.g., bank) may allow transactions even without the user logging into the service provider application, as described below.

At block 210, the service provider application 150A residing on the mobile device 100 (working with the processor 110) may initiate a request to the mobile device 100 generate a cryptogram in response to a transaction (or other action requiring validation) being initiated. The service provider application 150A may have already associated a user ID&V with a known service provider ID&V system (e.g., an issuer, payment processor, etc.) based on a user ID generated by a successful biometric ID&V on the mobile device 100. In other words, the service provider application 150A may link the TEE/SE device ID (e.g., device ID) with the user ID, Similarly, a biometric user ID may be linked to a service provider device ID and service provider user account ID in a back-end system.

To facilitate this, at block 220, the service provider application 150A may request that the mobile device 100 initiate biometric ID&V from the user (e.g., consumer). For example, the service provider application 150A may send a request to the OS (e.g., via an API) to obtain a fingerprint from the user of the mobile device 100. The OS may interface with biometric identification and verification services running on the mobile device 100 to obtain the biometric ID&V. The mobile device 100 may then prompt the user for biometric ID&V. The user may provide a fingerprint scan, iris scan, voice sample, or any other form of biometric or even non-biometric data to authenticate with the system. At block 230, upon successful (e.g., positive) biometric ID&V by the user, the mobile device 100 may have received a valid ID&V response along with a timestamp of the biometric ID&V and a user ID. This step may occur at the time of the transaction.

At block 240, the service provider application 150A on the mobile device 100 may send a request to the SE/TEE 170 to generate a cryptogram. The generated cryptogram can be created from at least the following information or any subset thereof: the user ID, timestamp of the positive ID&V, result of the ID&V, SE/TEE unique device ID (e.g., manufacturer ID), service provider application ID (could be one or multiple), and service provider device ID. The cryptogram may be generated using any unique cryptogram generation algorithm. The algorithm may utilize DES, triple DES, AES, or any other suitable encryption algorithm. At block 250, the data elements used to generate the cryptogram, along with the cryptogram itself, may be sent in a message from the mobile device 100 back to the back end service provided by the service provider computer. In some embodiments, the message may be sent out of band (e.g., not part of a standard authorization request message).

The back end service provided by the service provider computer (e.g., bank) may on its own, or by requesting another entity (such as a payment processor), validate the cryptogram. The bank end service or the other entity (e.g., payment processor) may provide these validation services on behalf of the mobile device 100 manufacturer and may have access to a Master Derivation Key (MDK), which can be used to generate a UDK, which can be used to decrypt the cryptogram and confirm that the cryptogram contains the same data elements as the data elements received in the message from the mobile device 100. This process may be performed using cryptography techniques known in the art (e.g., calculating the UDK from a data set is described in U.S. Published Patent Application No. 20050043997, which is herein incorporated by reference in its entirety). The cryptogram may be decrypted and the data elements decrypted from the cryptogram may be compared against the data elements in the transaction message. Validation of the cryptogram may be dependent upon the data elements in the cryptogram matching the data elements in the transaction message. Upon validation of the cryptogram, both the back end service and the service provider application may be confident that the device ID provided by the SE/TEE is unique and correct. The device ID can be compared to the device ID generated on the mobile device 100 by the back end service provided by the service provider computer. Both the back end service and the service provider application 150A may also be confident that the consumer (e.g., user) was validated securely by the mobile device 100 and remains validated based on the timestamp data for as long as the service provider application wishes to trust that validation before requesting re-authentication. Further, the service provider consumer ID can be mapped to an original profile setup ID that was linked to the user's biometric data. The back end service and the service provider application can be assured that the service provider user ID is matched with the user ID and is confirmed by the biometric validation.

Various other entities through which the message sent by the mobile device 100 passes may also use the same cryptogram to confirm their own acceptance of the consumer and device validity.

The implementation described above may allow the service provider application 150A to securely identify the mobile device 100 and the consumer to back end systems without requiring additional login steps by passing a cryptographic ID to a back end system based on a positive ID&V of the user on the mobile device 100. This implementation can be combined with cloud based payments to provide banks with out of band confirmation of consumer purchases. When a high value POS transaction is conducted and requires a identity check of the consumer, in addition to performing the transaction, the service provider application 150A can produce an identity check cryptogram as part of the transaction and can upload it to a cloud based payment server. If a dispute occurs as to whether the consumer made the purchase, the authorizing bank (or other institution) may perform an identity check and can determine with high confidence: (a) that the consumer identified himself to the known mobile device using biometrics or another form of validation, (b) the approximate time of the transaction, and (c) the geographic location of the transaction using a geolocation marker.

Figure 3:
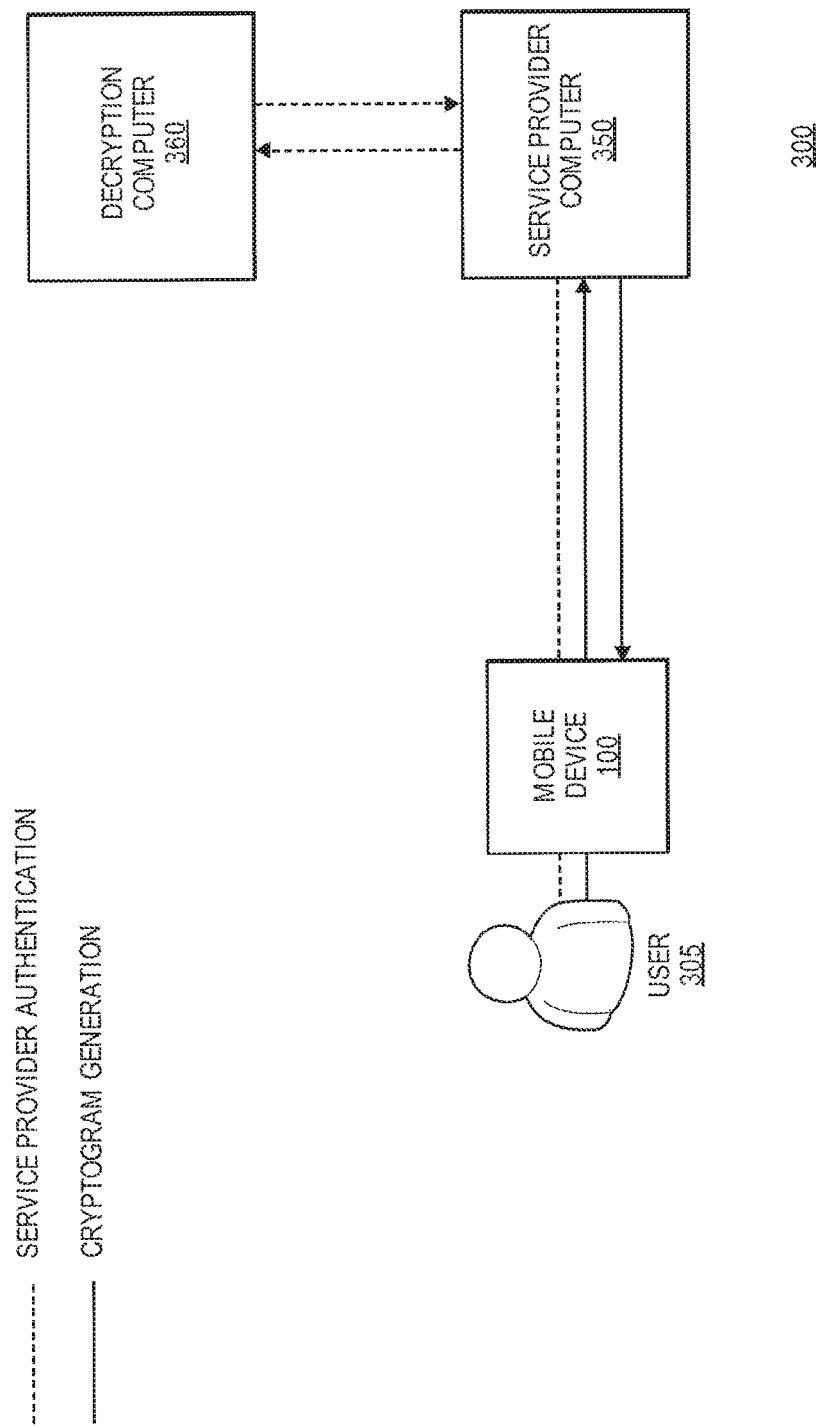
FIG. 3 shows a flow diagram of accessing a service provider service using a secure authentication system, according to some embodiments of the invention.

FIG. 3 shows a flow diagram of accessing a service provider service using a secure authentication system, according to some embodiments of the invention. FIG. 3 illustrates an example of a user 305 attempting to access data from a service provider via a third-party computer 350. For example, the user 305 may wish to pull/access his/her medical records from a healthcare provider (e.g., service provider). The user may attempt to do this by executing a healthcare mobile application (e.g., service provider application) on the mobile device 100.

The service provider (e.g., healthcare provider) may want to ensure that the user 305 is authentic and the mobile device 100 being used to access the information is in fact the same mobile device 100 that initially registered with the service provider at the time of enrollment, before the service provider computer 350 releases sensitive information. In currently existing implementations, the service provider may request login credentials from the user on the mobile device 100. However, this method is cumbersome and also subject to being the victim of fraudulent activity by a fraudster, Instead, in some embodiments of the invention, the service provider computer 350 may request that the user 305 authenticate with the ID&V application 150C residing on the mobile device 100. The mobile device 100 may request the user 305 to authenticate with the ID&V application 150C. This request may be initiated by the service provider application 150A by making a requesting the mobile device's 100 OS for the ID&V application 150C to authenticate the user 305.

The ID&V application 150C may then request ID&V from the user 305. For example, the ID&V application 150C may request that the user 305 provide a biometric sample (e.g., a fingerprint) via the mobile device 100. The user 305 may then place his thumb on the ID&V hardware 160 (e.g., a fingerprint scanner). Upon positive ID&V by the user 305 to the ID&V application 150C, the ID&V application 150C may pass a request to the cryptogram generation module 150B to generate a cryptogram for this particular user 305 request to access information from the service provider computer 350. The cryptogram generation module 150B may then generate a cryptogram on the secure element 170 residing within the mobile device 100. That is, the cryptogram may be generated by hardware (e.g., the secure element 170) present within the mobile device 100. Generating the cryptogram within hardware may provide increased security over generating the cryptogram in software.

The cryptogram may include various data elements associated with the user 305, mobile device 100, and service provider application 150A. The cryptogram may include, but is not limited to, a user identification (ID) associated with the user, a timestamp, a device ID associated with the mobile device, a service provider application ID associated with the service provider application, and a service provider device ID. The service provider application ID may be assigned to the particular service provider of the healthcare application (e.g., service provider application 150A). The service provider device ID may be assigned to the combination of the user 305 and the specific mobile device 100 by the service provider computer 350. The device ID may be a unique device ID associated with the secure element 170, and may only be known to the secure element 170 itself. The cryptogram may be calculated and generated by the secure element 170 based on these various data elements described. In essence, the cryptogram is calculated based on data elements that can only really be obtained from the mobile device 100 itself, making it extremely difficult for fraudsters to duplicate the cryptogram.

Upon generation of the cryptogram, the cryptogram generation module 150B may pass the cryptogram back to the service provider application 150A. The service provider application 150A may then transmit the cryptogram in a standard message format used by the service provider application 150A to the service provider computer 350. The standard message may also contain the individual various data elements that were used to generate the cryptogram itself. In some embodiments, the cryptogram may be sent in a separate message to the service provider computer 350 that is different from the standard message.

The service provider computer 350 (having the derivation key) may then decrypt the cryptogram to view the data elements that were encrypted in the cryptogram by the cryptogram generation module 150B and the secure element 170. In some embodiments, the service provider computer 350 may transmit the cryptogram to a separate decryption computer 360 for decrypting the cryptogram. The decryption computer 360 may belong to a separate service provider than the service provider operating the service provider computer 350. Upon decrypting the cryptogram, the decryption computer 360 may then transmit the decrypted data elements from the cryptogram back to the service provider computer 350.

In either scenario, once the cryptogram is decrypted (by either the service provider computer 350 or the decryption computer 360), the service provider computer 350 may compare the decrypted data elements to the data elements that were received from the service provider application 150A as part of the standard message. If the decrypted data elements match the data elements received as part of the standard message, the service provider application may be confident that the user 305 is authentic and the mobile device 100 is the authentic mobile device 100. On the other hand, the decrypted data elements do not match the data elements received as part of the standard message, the service provider computer 350 may suspect fraudulent activity.

The service provider computer 350 may then release the requested information to the service provider application 150A. In this example, the healthcare provider may release the sensitive healthcare data to the healthcare application for the user's 305 viewing.

Figure 4:
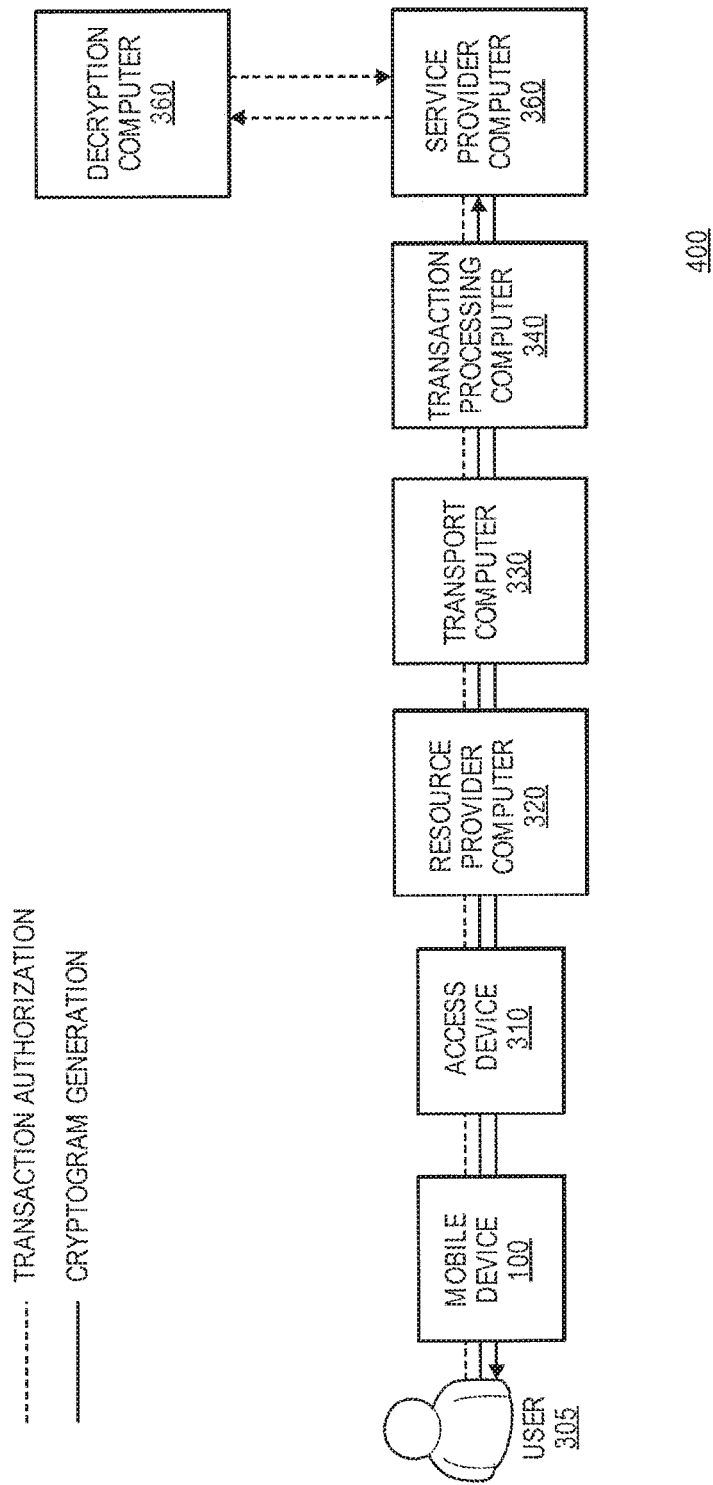
FIG. 4 shows a flow diagram of a transaction using a secure authentication system, according to some embodiments of the invention.

FIG. 4 shows a flow diagram of a transaction using a secure authentication system 400, according to some embodiments of the invention. The system 400 comprises a mobile device 100 which may be associated with a user 305 and may be able to provide payment credentials to an access device 310, via a service provider application 150A (e.g., a digital wallet application). The access device 310 may be associated and in communication with a resource provider computer 320, Further, the resource provider computer 320, a transport computer 330, a transaction processing computer 340, an service provider computer 350, and/or a decryption computer 360 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not, limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 305 may be able to use the mobile device 100 to conduct transactions with a resource provider associated with the resource provider computer 320. The mobile device 100 may store information associated with the user 305 and/or a payment account. For example, the mobile device 100 may store payment credentials as well as personal information such as a name, address, email address, phone number, or any other suitable user 305 identification information within a digital wallet application (e.g., a service provider application 150A. The mobile device 100 may provide this information to the access device 310 during a transaction.

The resource provider computer 320 may be associated With a resource provider. The resource provider may engage in transactions, sell goods or services, or provide access to goods or services to the user 305. The resource provider may accept multiple forms of payment (e.g. via a digital wallet application on the mobile device 100) and may use multiple tools to conduct different types of transactions. For example, the resource provider may operate a physical store and use the access device 310 for in-person transactions. The resource provider may also sell goods and/or services via a website, and may accept payments over the Internet. In some embodiments, the resource provider computer 320 may also be able to request payment tokens associated with the user's payment credentials. In some embodiments, the resource provider may be a merchant and the resource provider computer 320 may be a merchant computer.

Authorization requests submitted by the resource provider computer 320 or the access device 310 may be sent to the transport computer 330 (which may be an acquirer computer). The transport computer 330 may be associated with the resource provider computer 320, and may manage authorization requests on behalf of the resource provider computer 320.

The transaction processing computer 340 may be disposed between the transport computer 330 and the service provider computer 350. The transaction processing computer 340 may include data processing subsystems, networks, and operations used to support and deliver authorization services, exception file services, and clearing and settlement services. For example, the transaction processing computer 340 may comprise a server coupled to a network interface (e.g., by an external communication interface), and databases of information. The transaction processing computer 340 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 340 may use any suitable wired or wireless network, including the Internet.

The transaction processing computer 340, the transport computer 330, and the service provider computer 350 may operate suitable routing tables to route authorization request messages and/or token request messages using payment credentials, payment tokens, and/or other suitable identifiers.

The service provider computer 350 may issue and manage a payment account (via a digital wallet application) and an associated mobile device 100 of the user 305. The service provider computer 350 may be able authorize transactions that involve use of the payment account (via the digital wallet application). Before authorizing a transaction, the service provider computer 350 may authenticate payment credentials received in the authorization request, and check that there is available credit or funds in an associated payment account. Further, the service provider computer 350 may also determine a risk level associated with the transaction, and may weigh the risk when deciding whether or not to authorize the transaction. The risk level may be determined based on validation of a cryptogram received by the service provider computer from the mobile device 100, similar to the flow described with respect to FIG. 3.

In some embodiments, the service provider computer 350 may be an issuer computer or a digital wallet provider computer. Either entity may have want confirmation that a user 305 using a service provider application 150A (e.g., issuer application or digital wallet provider application) running on the mobile device 100 and used to conduct the transaction is in fact an authentic user 305 using an authentic mobile device 100.

The decryption computer 360 may be able to provide cryptogram decryption services on behalf of the service provider computer 350. If the service provider computer 350 is unable to decrypt a received cryptogram, the service provider computer 350 may forward the cryptogram to the decryption computer 360 for decryption and then receive the decrypted data elements from the decryption computer 360.

The flow of the transaction including the elements described with respect to FIG. 4 can be further understood in the description of the following figure.

FIG. 5 illustrates the steps of a method 500 for conducting a 500 using a secure authentication system, according to some embodiments of the invention. The steps shown in the method 500 may be performed sequentially or in any suitable order in embodiments of the invention.

The various messages described below for the method 500 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TOP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

The user 305 may wish to purchase a good or service from the resource provider. However, prior to initiating a transaction, at step S502, a user 305 may download and install a service provider application 150A on his/her mobile device. The service provider application may be a digital wallet provider application or an issuer application and may be downloaded onto the mobile device 100 from a mobile application store. Upon downloading and installing the service provider application 150A (e.g., issuer application or digital wallet provider application), the user 305 may open the service provider application 150A to begin an initial registration procedure where the service provider application 150A registers with the service provider computer 350.

At step S504, the service provider application 150A running on the mobile device may enroll/register with the service provider computer. Enrollment/registration may include, but is not limited to, creation of a username/password for the user 305 to access the service provider computer 350, registration of the downloaded service provider application 150A with the service provider computer 350, and registration of the mobile device 100 with the service provider computer 350. During registration, the service provider computer 350 may assign and transmit a service provider device ID to the service provider application 150A. The service provider device ID may be a value that is unique to a combination of the user 305 and the mobile device 100. The service provider application 150A may store the service provider device ID locally within the mobile device 100 memory.

Once the user 305 and service provider application 150A are enrolled and registered with the service provider computer 350, the user 305 may attempt to initiate a transaction to purchase a good or service from the resource provider. At step S506, in order to perform the purchase/transaction, the user 305 may provide payment credentials (e.g. via the issuer application or digital wallet application) to the access device 310. For example, the user may open the service provider application 150A on the mobile device 100 in order to present the payment credentials to the access device 310. The payment credentials may include a PAN, a security code, an expiration date, a name, an address, a phone number, and/or any other suitable payment credentials.

At step S508, the resource provider computer 320 may receive (e.g. via the access device 310 or an online webpage) the payment credentials. In some embodiments, the resource provider computer 320 may then encrypt the payment credentials. For example, the resource provider computer 320 may encrypt the payment credentials with an issuer-specific key, or with standard merchant-acquirer encryption models. Alternatively, in some embodiments, the resource provider computer 320 may receive payment credentials that are already encrypted. For example, the mobile device 100 may use an issuer-specific key to encrypt the payment credentials, and may transmit the encrypted payment credentials to the access device 310. Accordingly, the resource provider computer 320 may not have access to sensitive unencrypted payment credentials.

At step S510, the resource provider computer 320 (or the access device 310) may send an authorization request message for the transaction to the transport computer 330. In some embodiments, the authorization request message may include the payment credentials. In some embodiments, the authorization request message may include a payment token instead of the payment credentials. The authorization request message may also include transaction information (e.g. items purchased, amount, etc.), merchant information (e.g. merchant name, location, etc.), and any other suitable information.

At step S512, the transport computer 330 may forward the authorization request message to the transaction processing computer 340. At step S514, the transaction processing computer 340 may forward the authorization request message to the service provider computer 350. As mentioned earlier, in this example, the service provider computer 350 may be an issuer computer or a digital wallet provider computer.

At step S516, prior to authorizing the transaction based on the data received in the authorization response message, the service provider computer 350 may also wish to perform authentication of the user 305 and mobile device 100 using the techniques described above. Accordingly, the service provider computer 350 may request a cryptogram from the mobile device 100.

At step S518, the mobile device 100 may generate a cryptogram similar to the method described with respect to FIG. 3. That is, a cryptogram may be generated on a secure element 170 of the mobile device 100. In order to generate the cryptogram, the mobile device 100 may request an ID&V application 150C to obtain ID&V from the user 305. The ID&V may include obtaining biometric ID&V from the user 305 (e.g., via a fingerprint scanner). Upon positive ID&V from the user 305, the cryptogram may be calculated and generated based on various data elements including, but not limited to, a user identification (ID) associated with the user, a timestamp, a device ID associated with the mobile device, a service provider application ID associated with the service provider application, and a service provider device ID.

At step S520, upon generation of the cryptogram, the mobile device 100 may transmit the cryptogram itself and the various data elements used to generate the cryptogram to the service provider computer 350. For example, the mobile device 100 may transmit the cryptogram and the user identification (ID) associated with the user, the timestamp, the device ID associated with the mobile device, the service provider application ID associated with the service provider application, and the service provider device ID to the service provider computer 350. The cryptogram and various data elements may be transmitted to the service provider computer 350 out-of-band (e.g., separate from the authorization request message).

At step S522, the service provider computer 350 may validate the received cryptogram by decrypting the cryptogram and comparing the decrypted data elements to the individual data elements received separate from the cryptogram. If the decrypted data elements match the data elements that were received separate from the cryptogram, the service provider computer 350 may be confident that the user 305 is an authentic user and the mobile device 100 is an authentic mobile device 100, In some embodiments, the service provider computer 350 may request a separate decryption computer to decrypt the cryptogram on its behalf. The service provider computer 350 may send the received cryptogram to the decryption computer and upon decrypting the cryptogram, the decryption computer may return the decrypted data elements to the service provider computer 350.

Upon having confidence that the user 305 is an authentic user and the mobile device 100 is an authentic mobile device 100, the service provider computer 350 may authorize or reject the transaction based on the payment credentials received in step S514. For example, the service provider computer 350 may identify the payment account associated with the payment credentials and/or payment token, and may determine whether there are sufficient funds in the account.

At step S524, the service provider computer 350 may send an authorization response indicating whether or not the transaction was authorized to the transaction processing computer 340. The authorization response message may include the payment credentials, transaction details, merchant information, and any other suitable information. In some embodiments, in order to protect the payment credentials by limiting exposure, the authorization response message may not include the payment credentials.

At step S526, the transaction processing computer 340 may forward the authorization response message to the transport computer 330. At step S528, the transport computer 330 may forward the authorization response message to the resource provider computer 320.

At step S530, the resource provider computer 320 may release the purchased goods and/or services to the user based on the authorization response message. Further, the resource provider computer 320 may store a transaction record including the payment credentials, user information, transaction details, and any other suitable information. In some embodiments, the resource provider computer 320 may erase any sensitive information, such as the encrypted or unencrypted payment credentials.

In other embodiments, the cryptogram generation step S518 could occur before step S506. The cryptogram could be passed along with or as part of the payment credentials which are passed to the access device 310 and that are eventually passed to the service provider computer 350. The service provider computer 350 could then validate the cryptogram at the same time that it authorizes the transaction. In such embodiments, a separate communication step such as step S520 is not needed.

Embodiments of the invention allow a number of alternatives to various aspects of the method 500. While the examples described herein are directed toward obtaining medical records from a healthcare provider and completing a transaction for a purchase of goods, the secure authentication system may be used to authenticate with any type of service provider requiring authentication. For example, the secure authentication system can be used to authenticate with a social network, website, shopping website, etc.

A computer apparatus may be used to implement the above-described components. The subsystems in an exemplary computer apparatus may be interconnected via a system bus. Additional subsystems include a printer, keyboard, storage device, and monitor, which is coupled to display adapter. Peripherals and input/output (I/O) devices, which couple to an I/O controller, can be connected to the computer system by any number of means known in the art, such as a serial port. For example, an I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for authentication, comprising:
receiving, by a mobile device, a user request to access a service provider application on the mobile device;
providing, by the mobile device, credentials to an access device, which transmits an authorization request message comprising the credentials and a transaction amount to a service provider computer;
receiving a request, by the mobile device from the service provider computer, for a cryptogram;
requesting, by the mobile device, using the service provider application, identification and verification from a user via an identification and verification application residing within the mobile device;
receiving, by the identification and verification application on the mobile device, a positive identification and verification response;
in response to the positive identification and verification response, generating, by a cryptogram generation module within a secure element in the mobile device, the cryptogram; and
transmitting, by the mobile device, the cryptogram to the service provider computer,
wherein the service provider computer verifies the cryptogram and thereafter allows the mobile device to perform a transaction.

2. The method of claim 1, wherein the cryptogram is also generated using one or more of a user identification (ID) associated with the user, a timestamp, a service provider application ID, a device ID associated with the mobile device, or a service provider device ID.

3. The method of claim 1, wherein the service provider computer verifies the cryptogram by determining a plurality of data elements encoded within the cryptogram, and then comparing the determined plurality of data elements to other data elements received from the mobile device.

4. The method of claim 3, wherein the user and the mobile device are authenticated based on the comparing.

5. The method of claim 1, wherein the cryptogram is also generated using the positive identification and verification response.

6. The method of claim 1, wherein the identification and verification comprises at least one of fingerprint identification and verification, iris identification and verification, or voice identification and verification.

7. The method of claim 1, wherein the cryptogram is transmitted to the service provider computer over the Internet.

8. The method of claim 1, wherein the service provider computer is a digital wallet provider computer and the service provider application is a digital wallet application.

9. A mobile device, comprising:
a processor; and
a non-transitory computer readable medium, the non-transitory computer readable medium comprising code, executable by the processor, for implementing a method:
receiving, by the mobile device, a user request to access a service provider application on the mobile device;
providing, by the mobile device, credentials to a resource provider computer, which transmits an authorization request message comprising the credentials and a transaction amount to a service provider computer;
receiving a request, by the mobile device from the service provider computer, for a cryptogram;
requesting, by the mobile device, using the service provider application, identification and verification from a user via an identification and verification application residing within the mobile device;
receiving, by the identification and verification application on the mobile device, a positive identification and verification response;
in response to the positive identification and verification response, generating, by a cryptogram generation module within a secure element in the mobile device, the cryptogram; and
transmitting, by the mobile device, the generated cryptogram to the service provider computer,
wherein the service provider computer verifies the cryptogram and thereafter allows the mobile device to perform a transaction.

10. The mobile device of claim 9, wherein the cryptogram is also generated using one or more of a user identification (ID) associated with the user, a timestamp, a service provider application ID, a device ID associated with the mobile device, or a service provider device ID.

11. The mobile device of claim 9, wherein the service provider computer verifies the cryptogram by determining a plurality of data elements encoded within the cryptogram, and then comparing the determined plurality of data elements to other data elements received from the mobile device.

12. The mobile device of claim 11, wherein the user and the mobile device are authenticated based on the comparing.

13. The mobile device of claim 9, wherein the cryptogram is also generated using the positive identification and verification response.

14. The mobile device of claim 9, wherein the identification and verification comprises at least one of fingerprint identification and verification, iris identification and verification, or voice identification and verification.

15. The mobile device of claim 9, wherein the cryptogram is transmitted to the service provider computer over the Internet.

16. The mobile device of claim 9, wherein the cryptogram is matched to a transaction ID by the service provider computer.

17. A method for authentication, comprising:
receiving, by a service provider computer, an authorization request message comprising a credential and a transaction amount from an access device, wherein the access device received the credential from a mobile device;
requesting, by the service provider computer from the mobile device, a cryptogram;
receiving, by the service provider computer associated with a service provider application, the cryptogram, wherein the cryptogram was generated by a cryptogram generation module in a secure element on the mobile device, by encrypting data in response to a positive identification and verification response, the positive identification and verification response received in response to an identification and verification request to a user of the mobile device, initiated by an identification and verification application on the mobile device;

decrypting, by the service provider computer, the received cryptogram; and verifying, by the service provider computer, the cryptogram by determining a plurality of data elements encoded within the cryptogram, and then comparing the determined plurality of data elements to other data elements received by the service provider computer.

18. The method of claim 17, further comprising:

authenticating the user of the mobile device based on the verifying.

19. The method of claim 17, wherein the identification and verification application comprises one or more of fingerprint identification and verification, iris identification and verification, or voice identification and verification.

\* \* \* \* \*